United States Patent
Niu et al.

(10) Patent No.: US 7,720,659 B2
(45) Date of Patent: May 18, 2010

(54) SIMULATING FLUID FLOW IN RESERVOIR WITH MODIFIED GRID

(75) Inventors: Yuqiang Niu, Beijing (CN); Andrew Carnegie, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 411 days.

(21) Appl. No.: 11/824,692

(22) Filed: Jun. 30, 2007

(65) Prior Publication Data
US 2009/0006057 A1  Jan. 1, 2009

(51) Int. Cl.
G06G 7/48 (2006.01)
G06F 17/10 (2006.01)
(52) U.S. Cl. ............................ 703/10; 703/2; 702/12
(58) Field of Classification Search .............. 703/2, 703/6, 9, 10; 702/6, 10–13; 367/69
See application file for complete search history.

(56) References Cited

U.S. PATENT DOCUMENTS 6,018,497 A * 1/2000 Gunasekera ............. 367/72
6,078,869 A * 6/2000 Gunasekera ............. 702/6
6,842,700 B2 * 1/2005 Poe ........................ 702/13

OTHER PUBLICATIONS

Donald W. Peaceman, Interpretation of Well-Block Pressures in Numerical Reservoir Simulation With Nonsquare Grid Blocks and Anisotropic Permeability, SPE 10528, Jun. 1983, p. 531-543, 566-569.
S. Ghosh, Curvilinear Local Grid Refinement, SPE 50633, 1998, p. 29-43.
F. Sonier, P. Chaument, A Fully Implicit Three-Dimensional Model in Curvilinear Coordinates, SPE 4543, 1974, pp. 361-370.
Y. Ding, L. Jeannin, New Numerical Schemes for Near-Well Modeling Using Flexible Grids, SPE 87679, Mar. 2004, p. 109-121.

* cited by examiner

*Primary Examiner*—Russell Frejd
(74) *Attorney, Agent, or Firm*—Hoffman Warnick LLC

(57) ABSTRACT

A method, system and computer program product for simulating a fluid flow in a reservoir are disclosed. According to an embodiment, the current invention includes a method for simulating a fluid flow in a reservoir, the method comprising: providing an initial grid including multiple grid cells, each grid cell including a cell property; adjusting the initial grid to generated a modified grid in the case that a pressure equivalent radius under the initial grid is smaller than a well bore radius of the reservoir; and simulating the fluid flow in the reservoir based on the modified grid.

22 Claims, 3 Drawing Sheets

SIMULATING FLUID FLOW IN RESERVOIR WITH MODIFIED GRID

FIELD OF THE INVENTION

The disclosure relates in general to oil reservoir development, and more particularly to methods, systems and computer program products for simulating a fluid flow in a reservoir with a fine grid.

BACKGROUND OF THE INVENTION

In the life cycle of a reservoir development, numerical reservoir simulations (hereinafter, "reservoir simulation") become indispensable to understand the fluid flow and the distribution of underground fluid. In a simulation of a fluid flow in an oil reservoir, the equations governing fluid flow are solved by finite difference techniques. A fluid flow simulation typically uses a mesh of Cartesian grid cells (hereinafter, a "grid") to represent an oil reservoir. To achieve the necessary numerical accuracy, the grid cells need to be very small in the vicinities of the well bore of the reservoir. In the following description, the grid cells adjacent to the well bore will be referred to as "near well bore cells", and the cell(s) that contains the well bore will be referred to as the "well bore cell".

In the conventional approaches of reservoir fluid flow simulation, there is a major constraint that governs the minimum dimensions of the near well bore cells and the well bore cell(s). The restraint can be described as follows. In conventional fluid flow simulations, a simulator determines the flowing completion pressure by the following equation:

$$T_{wj} = \frac{c\theta Kh}{\ln\left(\frac{R_o}{R_w}\right)+s}, \quad (1)$$

where:
  $T_{wj}$ denotes a connection transmissibility factor;
  c denotes a unit conversion factor;
  $\theta$ denotes the angle of the segment connecting with the cell;
  Kh denotes the effective permeability times net thickness of the connection;
  $R_o$ denotes the "pressure equivalent radius" of the grid;
  $R_w$ denotes the well bore radius; and
  s denotes the skin factor.

As shown in equation (1), the calculation of the connection transmissibility (i.e., connection transmissibility factor $T_{wj}$) to the well bore involves a "pressure equivalent radius" variable $R_0$, which is the distance from the well to where the local pressure is equal to the nodal average pressure of the grid. A pressure equivalent radius for a vertical well can be determined by the following equation:

$$R_0 = 0.28 \frac{\sqrt{D_x^2\sqrt{\frac{K_y}{K_x}} + D_y^2\sqrt{\frac{K_x}{K_y}}}}{\sqrt[4]{\frac{K_y}{K_x}} + \sqrt[4]{\frac{K_x}{K_y}}} \quad (2)$$

where $R_0$ denotes pressure equivalent radius, $D_x$ and $D_y$ denote the x-direction and the y-direction dimensions of the grid cell, respectively, and $K_x$ and $K_y$ denote the x-direction and y-direction permeability, respectively. The following article described the above-referenced equation (2) and is incorporated herein by reference: Donald W. Peaceman, Interpretation of Well-Block Pressures in Numerical Reservoir Simulation With Nonsquare Grid Blocks and Anisotropic Permeability, SPE 10528, 1983.

The involvement of pressure equivalent radius $R_0$ in equation (1) causes a constraint because conventional approaches cannot handle the situation where a pressure equivalent radius $R_0$ is smaller than the well bore radius $R_w$. On the other hand, for reasons of numerical accuracy, it is undesirable to have a well bore cell much larger than the near well bore cells. That is, the well bore cell and the near well bore cells all need to be sufficiently small such that stiff numerical problems can be solved, which relates to the solution of the near well bore behavior. But as noted above, a pressure equivalent radius cannot be smaller than the well bore radius.

SUMMARY OF THE INVENTION

A first aspect of the invention is directed to a method for simulating a fluid flow in a reservoir, the method comprising: providing an initial grid including multiple grid cells, each grid cell including a cell property; adjusting the initial grid to generate a modified grid in the case that a pressure equivalent radius under the initial grid is smaller than a well bore radius of the reservoir; and simulating the fluid flow in the reservoir based on the modified grid.

A second aspect of the invention is directed to a system for simulating a fluid flow in a reservoir, the system comprising: means for providing an initial grid including multiple grid cells, each grid cell including a cell property; means for adjusting the initial grid to generate a modified grid in the case that a pressure equivalent radius under the initial grid is smaller than a well bore radius of the reservoir; and means for simulating the fluid flow in the reservoir based on the modified grid.

A third aspect of the invention is directed to a computer program product for simulating a fluid flow in a reservoir, comprising: computer usable program code which, when executed by a computer system, is configured to: receive an initial grid including multiple grid cells, each grid cell including a cell property; adjust the initial grid to generate a modified grid in the case that a pressure equivalent radius under the initial grid is smaller than a well bore radius of the reservoir; and simulate the fluid flow in the reservoir based on the modified grid.

A fourth aspect of the invention is directed to a method of generating a system for simulating a fluid flow in a reservoir, the method comprising: providing a computer infrastructure operable to: receive an initial grid including multiple grid cells, each grid cell including a cell property; adjust the initial grid to generate a modified grid in the case that a pressure equivalent radius under the initial grid is smaller than a well bore radius of the reservoir; and simulate the fluid flow in the reservoir based on the modified grid.

Other aspects and features of the present invention, as solely defined by the claims, and additional advantages of the invention will become apparent to those skilled in the art upon reference to the following non-limited detailed description taken in conjunction with the provided figures.

BRIEF DESCRIPTION OF THE DRAWINGS

The disclosure is illustrated by way of example and not intended to be limited by the figures of the accompanying drawings in which like references indicate similar elements and in which.

Figure 1:
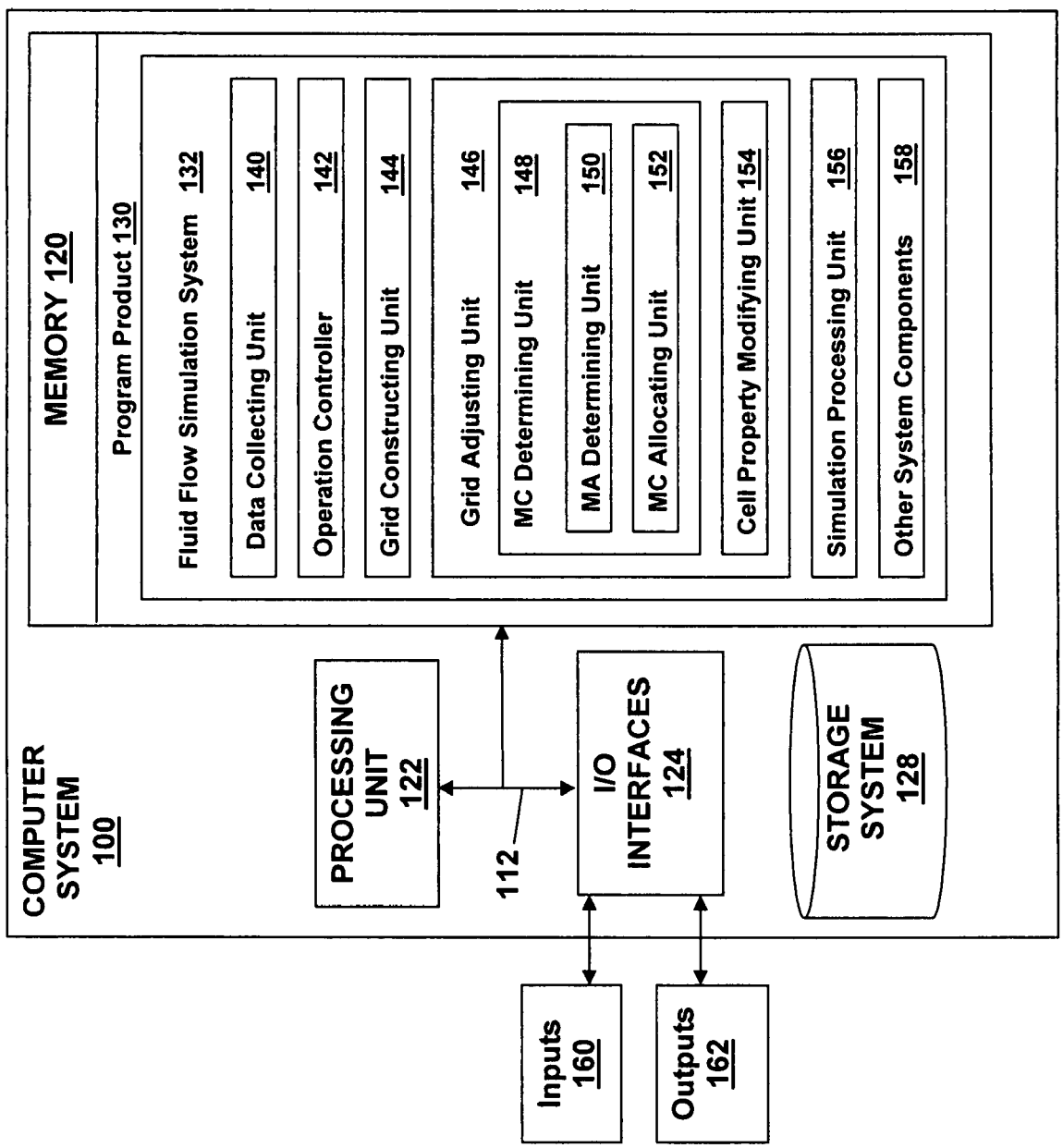
FIG. 1 shows a block diagram of an illustrative computer system according to an embodiment.

It is noted that the drawings are not to scale.

DETAILED DESCRIPTION OF THE DISCLOSURE

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

1. Computer System

Referring to FIG. 1, a block diagram of an illustrative computer system 100 is shown. In an embodiment, computer system 100 includes a memory 120, a processing unit (PU) 122, input/output (I/O) interfaces 124. A storage system 128 may also be provided for storage of data relative to processing tasks. Memory 120 includes a program product 130 that, when executed by PU 122, comprises various functional capabilities described in further detail below. Memory 120 (and storage system 128) may comprise any known type of data storage system and/or transmission media, including magnetic media, optical media, random access memory (RAM), read only memory (ROM), a data object, etc. Moreover, memory 120 (and storage system 128) may reside at a single physical location comprising one or more types of data storage, or be distributed across a plurality of physical systems. PU 122 may likewise comprise a single processing unit, or a plurality of processing units distributed across one or more locations. I/O interfaces 124 may comprise any known type of input/output device including a network system, modem, keyboard, mouse, scanner, voice recognition system, CRT, printer, disc drives, etc. Additional components, such as cache memory, communication systems, system software, etc., may also be incorporated into computer system 100.

As shown in FIG. 1, program product 130 may include a fluid flow simulation system 132. Fluid flow simulation system 132 may include a data collecting unit 140; an operation controller 142; a grid constructing unit 144; a grid adjusting unit 146 including a modification cell (MC) determining unit 148 and a cell property modifying unit 154; simulation processing unit 156; and other system components 158. Modification cell (MC) determining unit 148 further includes a modification area (MA) determining unit 150 and a modification cell (MC) allocating unit 152. Other system components 158 may include any now known or later developed parts of a computer system 100 not individually delineated herein, but understood by those skilled in the art.

Inputs 160 to computer system 100 include, for example, information regarding a target reservoir obtained using any now known or later developed devices/methods. The information may include, for example, well bore radius and reservoir formation (e.g., rock) properties, e.g., porosity and permeability. Those inputs may be communicated to computer system 100 through I/O interfaces 124 and may be stored in storage system 128. Outputs 162 of computer system 100 include, for example, simulation results that may be communicated to, among others, a user to act accordingly. The operation of fluid flow simulation system 132 will be described in detail below.

2. Operation Methodology

Figure 2:
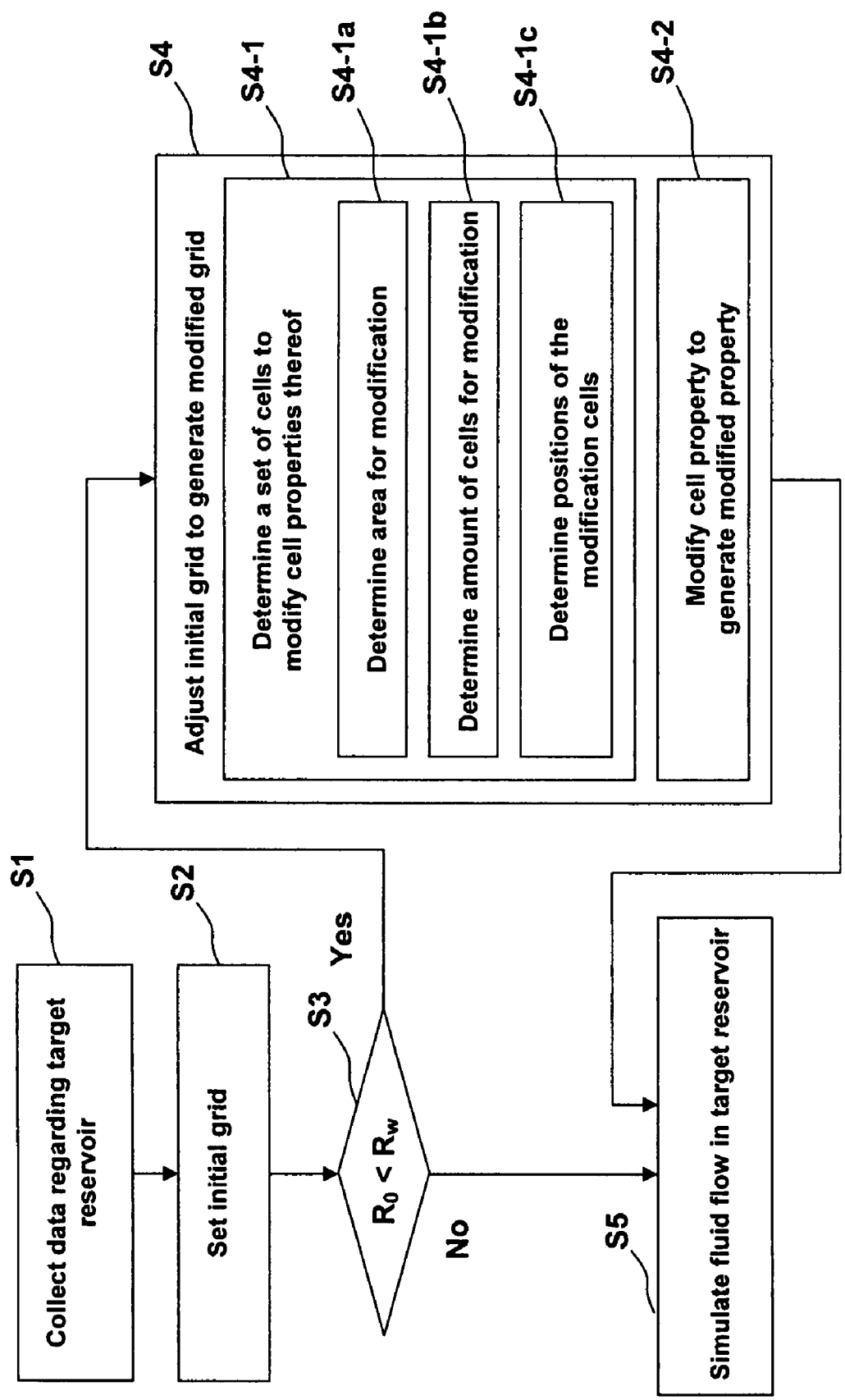
FIG. 2 shows an embodiment of the operation of a fluid flow simulation system according to an embodiment.

FIG. 2 shows an embodiment of the operation of fluid flow simulation system 132. Referring now to FIGS. 1-2, in process S1, data collecting unit 140 collects data regarding a target reservoir (e.g., an oil reservoir), a fluid flow in which needs to be simulated. The data includes, for example, well bore radius and formation properties of the target reservoir, e.g., formation permeability and porosity. A formation property of a reservoir refers to a natural property of the reservoir formation (e.g., rock).

In process S2, grid constructing unit 144 sets an initial mesh of grid cells (grid) to represent the target reservoir, each grid cell including a cell property. Any type of grid cell may be used and all are included in the invention. For example, Cartesian grid cells may be used in the initial grid. The initial grid includes near well bore cells, i.e., cells adjacent to the well bore, and well bore cell(s), i.e., a cell(s) containing the well bore. The setting of the grid is initial to the extent that the initially set grid, e.g., the near well bore cells and the well bore cell, might be adjusted/modified later as will be described. The setting of the initial grid includes setting grid cell dimensions and cell properties. A cell property in the initial grid refers to a property of the reservoir formation represented by a specific grid cell. For example, a formation permeability value may be set for a grid cell to represent the part of the reservoir formation represented by the grid cell. A grid cell dimension may include an x-direction dimension and a y-direction dimension. It should be appreciated that any method of initially setting a grid for a target reservoir may be used, and all are included in the invention. It should also be appreciated that process S2 is optional for the current invention, and an initial grid may be provided as preset parameters for fluid flow simulation system 132 to operate thereupon.

In process S3, operation controller 142 determines whether a pressure equivalent radius ($R_0$) under the initial grid is smaller than a well bore radius ($R_w$) of the target reservoir. If the pressure equivalent radius is larger than or equal to the well bore radius, the initially set grid does not need to be modified and a simulation using the conventional approaches is sufficient. In this case, operation controller 142 controls the operation of fluid flow simulation system 132 to go to process S5. If the pressure equivalent radius is smaller than the well bore radius, operation controller 142 controls the operation of fluid flow simulation system 132 to go to process S4, where the initial grid, e.g., the near well bore cells and the well bore cell(s), will be adjusted/modified.

In process S4, grid adjusting unit 146 adjusts the initial grid to generate a modified grid. Process S4 includes two sub-processes. In sub-process S4-1, modification cell (MC) determining unit 148 determines a set of cells adjacent to and containing the well bore of the target reservoir to modify cell properties thereof. Such cells are referred to as "modification cells". Sub-process S4-1 may include S4-1a, S4-1b and S4-1c. In S4-1a, modification area (MA) determining unit 150 determines an area of grid cells for modification (referred to as a "modification area"). In the current description, the modification area does not necessarily include any specific positions/locations in a grid mesh but only refers to a size of the area covered by certain grid cells. Any method for determining the modification area can be used and all are included in the disclosure. For example, according to an embodiment, MA determining unit 150 determines the modification area following the below procedures. First, a pseudo pressure equivalent radius ($R_s$) is determined as about the well bore radius, preferably approximately equal or larger than the well bore radius. The pseudo pressure equivalent radius is used only for the purposes of determining the modification area and bears no relationship with the actual pressure equivalent radius under the initial grid. Second, the x-direction and y-direction dimensions of a pseudo cell can be determined using the following equation:

$$R_s = 0.28 \frac{\sqrt{D_{sx}^2 \sqrt{\frac{K_y}{K_x}} + D_{sy}^2 \sqrt{\frac{K_x}{K_y}}}}{\sqrt[4]{\frac{K_y}{K_x}} + \sqrt[4]{\frac{K_x}{K_y}}}, \quad (3)$$

where $R_s$ denotes the pseudo pressure equivalent radius, $D_{sx}$ and $D_{sy}$ denotes the x-direction and the y-direction dimensions of the pseudo cell, respectively, and $K_x$ and $K_y$ denotes the provided x-direction and y-direction permeability, respectively. The following article described the above-referenced equation (3) and is incorporated herein by reference: Donald W. Peaceman, Interpretation of Well-Block Pressures in Numerical Reservoir Simulation With Nonsquare Grid Blocks and Anisotropic Permeability, SPE 10528, 1983. Here, a ratio between the x-direction and y-direction dimensions $D_{sx}$ and $D_{sy}$ of the pseudo cell may be assumed as known. After the x-direction and the y-direction dimensions of the pseudo cell are obtained, the modification area can be determined based on the pseudo cell. Specifically, the modification area may be determined as approximately equal to an area covered by the pseudo cell, i.e., x-direction dimension $D_{sx}$ times y-direction dimension $D_{sy}$. For illustrative purposes, in the following description, it is assumed, for example, that the modification area is determined as 38.5 unit areas.

In S4-1b, modification cell (MC) determining unit 148 determines an amount of the set of cells for modification. According to an embodiment, the amount of the set of cells is determined such that the set of cells approximately covers the modification area. According to an embodiment, MC determining unit 148 first determines a size, i.e., x-direction and y-direction dimensions, of a modification cell. A cell dimension of the modification cell may be different than that of the grid cell in the initial grid. According to another embodiment, the cell dimensions of the initial grid will be maintained and used for the modification cell. An area of the modification cell refers to a multiple of the x-direction and the y-direction dimensions of the modification cell. For illustrative purposes, in the following description, it is assumed, for example, that an area of the modification cell is determined as 1 unit area.

MC determining unit 148 may determine an approximate amount of the modification cells by dividing the modification area with the area of a modification cell. Under the above illustrative example, MC determining unit 148 may determine that approximately 38.5 modification cells need to be modified with cell properties. The division operation only approximately determines the amount of the modification cells because, among others, (1) the modification area may not be equally divided by the area of a modification cell, i.e., there might be a partial cell included in the modification area; and (2) the obtained amount of modification cells may not be sufficient to fill a complete layer, as will be described below. Any method may be used to handle the approximation problem and all are included in the disclosure. For example, according to an embodiment, the approximation may be biased toward inclusiveness. As such, a partial modification cell area will be approximated to include a whole modification cell, and a partial layer of modification cells will be approximated to be a whole layer, as will be described further below with the description of S4-1c.

Figure 3:
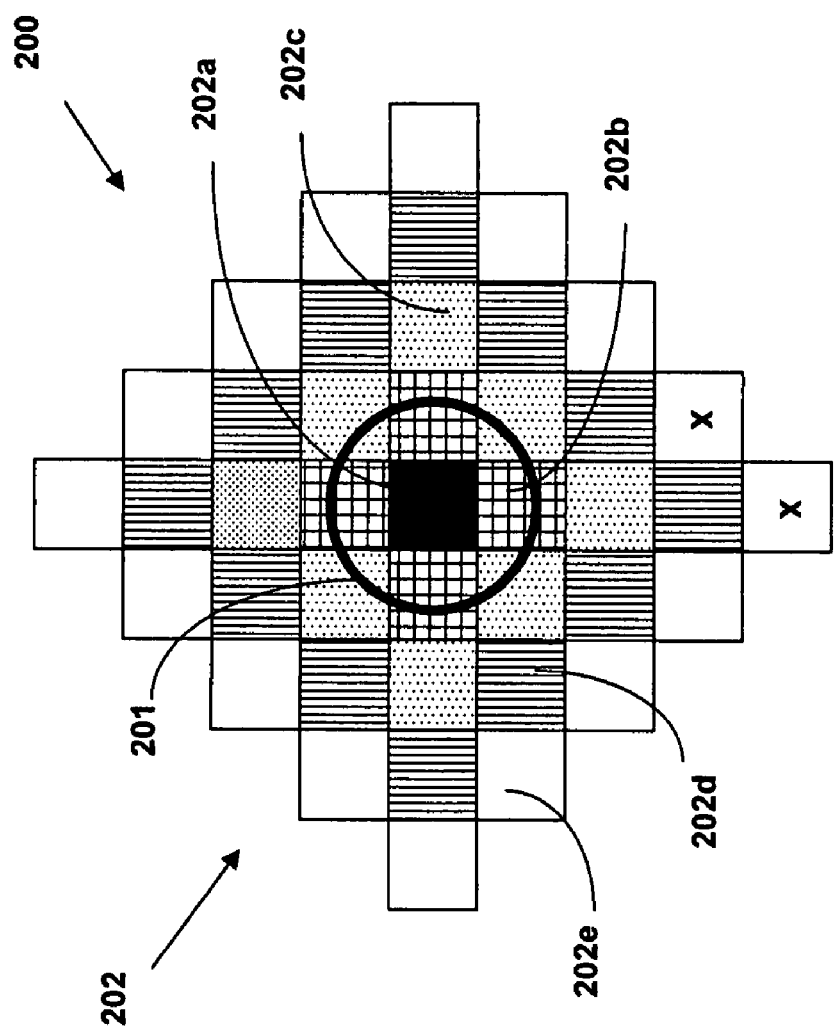
FIG. 3 shows an illustrative example of modification cells positioned in a layered manner adjacent to and containing a well bore according to an embodiment.

In S4-1c, MC allocating unit 152 determines the positions of the modification cells, i.e., allocating the modification cells adjacent to and containing the well bore of the target reservoir. According to an embodiment, the modification cells are positioned radially from and contain the well bore in a layered manner, a modification cell in an outer layer having at least one side contacting a modification cell in an immediately adjacent inner layer. An inner layer is positioned closer to the well bore than an outer layer. FIG. 3 shows an example 200 of such a layered manner of modification cells 202 allocated based on the above illustrative example of approximately 38.5 modification cells. In FIG. 3, cells 202 within each layer (202a-202e) are marked with a distinct pattern for illustrative purposes. Circle 201 (dark black line) represents an illustrative example of a well bore radius. For example, the approximate amount of modification cell, i.e., 38.5, is first approximated to be 39 to cover the partial cell (i.e., 0.5). The 39 modification cells are allocated in a layered manner radially from and containing well bore radius 201. As 39 modification cells cannot complete the outermost layer 202e, two additional modification cells, shown with mark "X" for illustrative purposes, are added to the outermost layer 202e to generate example 200 of modification cells. As shown in FIG. 3, example 200 includes five layers 202a-202e, with layer 202e being the outermost one.

Returning to FIGS. 1-3, in sub-process S4-2, cell property modifying unit 154 modifies a cell property of a modification cell to generate a modified property. According to an embodiment, modification cells 202 within the same layer, e.g., layer 202c, will be modified to have approximately the same modified property. Typically, the modified property, or order, of modification cells 202 changes gradually from an outer layer, e.g., layer 202e, to an inner layer, e.g., layer 202a. A cell property may be modified in any method, and all are included in the disclosure, provided that the modification increases the accuracy of simulation. For example, a cell property may include permeability. The modification of permeability may be implemented by changing a formation permeability of the reservoir represented by a modification cell by a ratio. Generally, a modification cell with a higher formation permeability value will be assigned a low modification ratio, and in the case that the formation permeability reaches an upper threshold, the modification ratio will be a constant. According to an embodiment, the modification ratio may be determined using the following equation until the formation permeability reaches an upper threshold:

$$Y = aX + b \quad (4),$$

where Y denotes the ratio and X denotes the formation permeability, factor a is a negative value and factor b is a positive value.

According to an embodiment, in the case the formation permeability is within a range of approximately 1 mili-darcy (md) to approximately 700 md, the ratio may be determined approximately using equation:

$$Y = -0.0073X + 10.073 \quad (5),$$

where Y denotes the ratio and X denotes the formation permeability. That is, factor a is approximately −0.0073 and factor b is approximately 10.073. In the case the formation permeability is larger than an upper threshold of approximately 700 md, the ratio is a constant of approximately 4.96.

In process S5, simulation processing unit 156 simulates the fluid flow in the target reservoir. The simulation will be based on the initial grid if process S4 is not performed. If process S4 is performed, the simulation will be based on the modified grid. Any simulation model may be used and all are included in the invention. For example, simulation processing unit 156 may use history matching integrated simulation or forward simulation for the simulation process.

Although the above description is based on a grid of Cartesian grid cells for illustrative purposes, it should be appreciated that the disclosure is not limited by this specific type of grid cell, and can be equally applicable to grids of other types of cells.

3. Conclusion

While shown and described herein as a method and system for simulating a fluid flow in a reservoir, it is understood that the invention further provides various additional features. For example, in an embodiment, the invention provides a program product stored on a computer-readable medium, which when executed, enables a computer infrastructure to simulate a fluid flow in a reservoir. To this extent, the computer-readable medium includes program code, such as fluid flow simulation system 132 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 120 (FIG. 1) and/or storage system 128 (FIG. 1), and/or as a data signal traveling over a network (e.g., during a wired/wireless electronic distribution of the program product).

In addition, a method of generating a system for simulating a fluid flow in a reservoir can be included. In this case, a computer infrastructure, such as computer system 100 (FIG. 1), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing system 100 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to exemplary embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention has other applications in other environments.

We claim:

1. A method for simulating a fluid flow in a reservoir, the method comprising:
providing an initial grid including multiple grid cells, each grid cell including a cell property;

adjusting the initial grid to generate a modified grid in the case that a pressure equivalent radius under the initial grid is smaller than a well bore radius of the reservoir; and simulating the fluid flow in the reservoir based on the modified grid.

2. The method of claim 1, wherein the grid adjusting includes determining a set of cells adjacent to and containing a well bore of the reservoir to modify cell properties thereof.

3. The method of claim 2, wherein the cell determining includes determining an area for modification based on a pseudo cell, dimensions of the pseudo cell being determined using an equation:

$$R_s = 0.28 \frac{\sqrt{D_{sx}^2 \sqrt{\frac{K_y}{K_x}} + D_{sy}^2 \sqrt{\frac{K_x}{K_y}}}}{\sqrt[4]{\frac{K_y}{K_x}} + \sqrt[4]{\frac{K_x}{K_y}}},$$

where $R_s$ denotes a pseudo pressure equivalent radius that is about the well bore radius, $D_{sx}$ and $D_{sy}$ denote x-direction and y-direction dimensions of the pseudo cell, respectively, and $K_x$ and $K_y$ denote x-direction and y-direction permeability under the provided initial grid, respectively.

4. The method of claim 3, wherein an amount of the set of cells is determined such that the set of cells approximately cover the area for modification.

5. The method of claim 2, wherein the set of cells are positioned radially from and contain the well bore in a layered manner, a cell in an outer layer having at least one side contacting a cell in an immediately adjacent inner layer, an inner layer being closer to the well bore than an outer layer.

6. The method of claim 5, wherein cells in a same layer include the same modified property.

7. The method of claim 2, wherein the grid adjusting further includes modifying a cell property of a cell of the set of cells to generate a modified property.

8. The method of claim 7, wherein the cell property includes permeability and the permeability modifying is implemented by changing a formation permeability of the reservoir represented by the cell by a ratio, in the case the formation permeability is within a range of approximately 1 mili-darcy to approximately 700 mili-darcy, the ratio being determined using equation:

$$Y=aX+b,$$

where Y denotes the ratio, X denotes the formation permeability, a is approximately −0.0073 and b is approximately 10.073; and in the case the formation permeability is larger than approximately 700 mili-darcy, the ratio being a constant of approximately 4.96.

9. The method of claim 2, wherein the set of cells includes a different cell dimension than a grid cell in the initial grid.

10. A computer program product for simulating a fluid flow in a reservoir, comprising:

computer readable program code stored in a computer readable storage device, the computer readable program code, when executed by a computer system, is configured to:

receive a provided initial grid including multiple grid cells, each grid cell including a cell property;

adjust the initial grid to generate a modified grid in the case that a pressure equivalent radius under the initial grid is smaller than a well bore radius of the reservoir; and simulate the fluid flow in the reservoir based on the modified grid.

11. The computer program product of claim 10, wherein the program code is further configured to determine a set of cells adjacent to and containing a well bore of the reservoir to modify cell properties thereof.

12. The computer program product of claim 11, wherein the cell determining includes determining an area for modification based on a pseudo cell, dimensions of the pseudo cell being determined using an equation:

$$R_s = 0.28 \frac{\sqrt{D_{sx}^2 \sqrt{\frac{K_y}{K_x}} + D_{sy}^2 \sqrt{\frac{K_x}{K_y}}}}{\sqrt[4]{\frac{K_y}{K_x}} + \sqrt[4]{\frac{K_x}{K_y}}},$$

where $R_s$ denotes a pseudo pressure equivalent radius that is about the well bore radius, $D_{sx}$ and $D_{sy}$ denote x-direction and y-direction dimensions of the pseudo cell, respectively, and $K_x$ and $K_y$ denote x-direction and y-direction permeability under the provided initial grid, respectively.

13. The computer program product of claim 12, wherein an amount of the set of cells is determined such that the set of cells approximately cover the area for modification.

14. The computer program product of claim 11, wherein the set of cells are positioned radially from and contain the well bore in a layered manner, a cell in an outer layer having at least one side contacting a cell in an immediately adjacent inner layer, an inner layer being closer to the well bore than an outer layer.

15. The computer program product of claim 14, wherein cells in a same layer include the same modified property.

16. The computer program product of claim 11, wherein the program code is further configured to modify a cell property of a cell of the set of cells to generate a modified property.

17. The computer program product of claim 16, wherein the cell property includes permeability and the permeability modifying is implemented by changing a formation permeability of the reservoir represented by the cell by a ratio, in the case the formation permeability is within a range of approximately 1 mili-darcy to approximately 700 mili-darcy, the ratio being determined using an equation:

$$Y=aX+b,$$

where Y denotes the ratio, X denotes the formation permeability, a is approximately −0.0073 and b is approximately 10.073; and in the case the formation permeability is larger than approximately 700 mili-darcy, the ratio being a constant of approximately 4.96.

18. The computer program product of claim 11, wherein the set of cells includes a different cell dimension than a grid cell in the initial grid.

19. A method of generating a system for simulating a fluid flow in a reservoir, the method comprising:

providing a computer infrastructure operable to:

receive a provided initial grid including multiple grid cells, each grid cell including a cell property;

adjust the initial grid to generate a modified grid in the case that a pressure equivalent radius under the initial grid is smaller than a well bore radius of the reservoir; and simulate the fluid flow in the reservoir based on the modified grid.

20. The method of claim 19, wherein the computer infrastructure is further operable to determine a set of cells adjacent to and containing a well bore of the reservoir to modify cell properties thereof, the cell determining including determining an area for modification based on a pseudo cell, dimensions of the pseudo cell being determined using an equation:

$$R_s = 0.28 \frac{\sqrt{D_{sx}^2 \sqrt{\frac{K_y}{K_x}} + D_{sy}^2 \sqrt{\frac{K_x}{K_y}}}}{\sqrt[4]{\frac{K_y}{K_x}} + \sqrt[4]{\frac{K_x}{K_y}}},$$

where $R_s$ denotes a pseudo pressure equivalent radius that is about the well bore radius, $D_{sx}$ and $D_{sy}$ denote x-direction and y-direction dimensions of the pseudo cell, respectively, and $K_x$ and $K_y$ denote x-direction and y-direction permeability under the provided initial grid, respectively.

21. The method of claim 20, wherein an amount of the set of cells is determined such that the set of cells approximately covers the area for modification, and the positions of the set of cells are determined to be radially from and contain the well bore in a layered manner, a cell in an outer layer having at least one side contacting a cell in an immediately adjacent inner layer, an inner layer being closer to the well bore than an outer layer.

22. The method of claim 21, wherein the computer infrastructure is further operable to modify a cell property of a cell of the set of cells to generate a modified property, cells in a same layer being modified to have the same modified property.

* * * * *